United States Patent
Tacke et al.

[15] 3,673,123
[45] June 27, 1972

[54] 2,2',4,4'-TETRACHLORO-5,5'-DIAMINO-DIPHENYL ETHER

[72] Inventors: Peter Tacke; Rudolf Binsack, both of Krefeld; Oskar Weissel, Krefeld-Bockum, all of Germany

[73] Assignee: Farbenfabriken Bayer Aktiengesellschaft, Leverkusen, Germany

[22] Filed: Feb. 27, 1970

[21] Appl. No.: 15,251

[30] Foreign Application Priority Data

March 21, 1969 Germany .................P 19 14 367.0

[52] U.S. Cl. ............................................260/571, 260/644
[51] Int. Cl. .........................................................C07c 93/14
[58] Field of Search .....................................................260/571

[56] References Cited

UNITED STATES PATENTS 3,544,637  12/1970  Kober et al. ........................260/571 X
3,531,522  9/1970   Nelson et al. .......................260/571 X Primary Examiner—Lewis Gotts
Assistant Examiner—C. F. Warren
Attorney—Connolly and Hutz

[57] ABSTRACT

The 2,2',4,4'-tetrachloro-5,5'-diamino-diphenyl ether which is useful as starting material for the production of polyamides and polyurethanes and which may be obtained by the reduction of the corresponding dinitro compound.

1 Claim, No Drawings

2,2',4,4'-TETRACHLORO-5,5'-DIAMINO-DIPHENYL ETHER

The object of the invention is 2,2',4,4'-tetrachloro-5,5'-diamino-diphenyl ether which is a valuable starting material for the production of nitrogen-containing synthetic substances, e.g., of polyurethanes by the reaction with phosgene or bis-chlorocarbonic acid esters, and of polyamides by the reaction with dicarboxylic acids, e.g., adipic acid. Polyurethanes and polyamides are known to be very valuable thermoplasts from which there are produced fibers, foils, films, foams and many technical articles and commodities. The diamino-diphenyl ether is a colorless crystalline substance having a melting point of 127° to 129° C.

This new diphenyl ether can easily be obtained by reduction of 2,2',4,4'-tetrachloro-5,5'-dinitro-diphenyl ether by known reducing processes, for example, by the reaction with metallic iron.

The 2,2',4,4'-tetrachloro-5,5'-dinitro-diphenyl ether is a colorless crystalline substance of melting point 141° to 142° C. It can be prepared by subjecting 2,2',4,4'-tetrachloro-diphenyl ether to the known conditions of nitration of benzene nuclei. A suitable instruction for this purpose is the following, for example:

150 ml of 98 percent nitric acid are placed in a flask fitted with stirrer, 100 g 2,2',4,4'-tetrachloro-diphenyl ether are added in portions while stirring. The reaction is strongly exothermic. The temperature of the reaction mixture is maintained at about 80° C. by external cooling or by a slow addition of the tetrachloro-diphenyl ether. The 2,2',4,4'-tetrachloro-5,5'-dinitro-diphenyl ether is precipitated from the reaction mixture in the form of yellow crystals. When all of the tetrachloro-diphenyl ether has been added, the mixture is allowed to cool down to about 20° C. The precipitation of the product is completed by the addition of 300 ml of water. The crystals are filtered off with suction and washed with water until free from acid. The crude yield after drying amounts to 134 g (98.5 percent of theory). The crystals have a melting point of 138° – 140° C. A melting point of 141° – 142° C. can be achieved by recrystallization from benzene, carbon tetrachloride or acetone.

The production of the nitro compound is further described in our copending application, Ser. No. 15,250 filed Feb. 27, 1970.

EXAMPLE 12 g 2,2',4,4'-tetrachloro-5,5'-dinitro-diphenyl ether are dissolved in 70 ml benzene. A mixture of 70 ml of water and 20 ml of concentrated hydrochloric acid is added to the reaction mixture. 15 g of iron powder are added with vigorous stirring. The temperature of the reaction mixture rises to about 50° C., When the temperature begins to fall, the reaction mixture is heated under reflux for 1 hour and then allowed to cool down. The benzene phase is separated and the aqueous phase is extracted with a little benzene. The benzene is distilled off from the combined benzene solutions. There remain 9.7 g of almost colorless crystals (96 percent of theory) of melting point 125° to 126° C. Completely colorless crystals of melting point 127.5° – 128.5° C. can be obtained by recrystallization from benzene or carbon tetrachloride.

Analysis: $C_{12}H_8ON_2Cl_4$ (336)
Calculated: N = 8.28%   Found: N = 8.3%
Cl = 41.9%   Cl = 41.9%

What we claim is:
1. 2,2',4,4'-tetrachloro-5,5'-diamino-diphenyl ether.

* * * * *